United States Patent [19]

Lennen

[11] Patent Number: 5,486,834
[45] Date of Patent: Jan. 23, 1996

US005486834A

[54] GLOBAL ORBITING NAVIGATION SATELLITE SYSTEM RECEIVER

[75] Inventor: Gary R. Lennen, San Jose, Calif.

[73] Assignee: Trimble Navigation Limited, Sunnyvale, Calif.

[21] Appl. No.: 287,187

[22] Filed: Aug. 8, 1994

[51] Int. Cl.[6] .................................. G01S 5/02; H04J 1/02
[52] U.S. Cl. .............................................. 342/357; 370/70
[58] Field of Search .................................. 342/357, 352; 370/69.1, 70

[56] References Cited

U.S. PATENT DOCUMENTS 4,463,357  7/1984  MacDoran ............................... 343/460
5,101,416  3/1992  Fenton et al. ............................. 375/1

OTHER PUBLICATIONS

Lennen, "The USSR'S P-Code—Determination and Initial Results" Proc. of ION GPS-89, 1989.
The USSR'S Glonass P-Code—Determination and Initial Results, by Gary R. Lennen, Proceedings of ION GPS-89, the Second International Technical Mtg. of Satellite Division of the Institute of Navigation, Colorado Springs, Colo., Sep. 27–29, 1989.
Global Satellite Navigation System GLONASS Interface Control Document (Second Wording), Russian Institute of Space Device Engineering/Research, 1991.

Primary Examiner—Gregory C. Issing
Attorney, Agent, or Firm—Thomas E. Schatzel

[57] ABSTRACT

A receiver embodiment of the present invention comprises a radio frequency section that down-converts frequency division signals received from the several orbiting GLONASS satellites into a composite pseudo-baseband with spectral fold-over, a Nyquist sampling unit for sampling the composite signal at twenty to twenty-five MHz, and a programmable carrier frequency in-phase (I) and quadrature-phase (Q) digital multiplier for sorting through the composite signal to find a particular GLONASS satellite's signal. The particular satellite is identified by comparing almanac and ephemeris information. Cross-correlations between L1 and L2 are performed by a correlation that is integrated over a whole data bit length and a proposed insertion bit is inverted or not inverted according to its sign before further summing.

8 Claims, 3 Drawing Sheets

GLOBAL ORBITING NAVIGATION SATELLITE SYSTEM RECEIVER

BACKGROUND OF THE INVENTION

1. Field of the Invention

The invention relates generally to navigation systems and more specifically to navigation receivers that operate with signals received from orbiting Russian navigation satellites.

2. Description of the Prior Art

The USSR, and now Russia, have deployed and support a satellite-based navigation system that is very similar to the global positioning system (GPS) erected by the United States government. The Russian system is called the global orbiting navigation satellite system (GLONASS) and transmits two ranging codes on two separate microwave frequency bands, e.g., "L1" around 1600 MHz and "L2" around 1250 MHz. GPS uses 1575.42 MHz and 1227.6 MHz, respectively. A coarse acquisition (C/A) code is transmitted on L1 and a precision (P) code is transmitted on both L1 and L2, for both systems.

Frequency division multiple access (FDMA) is used by GLONASS for discriminating between each of the orbiting satellite's signals. The GPS uses code division multiple access (CDMA) to sort out signals. There are also fundamental differences in the structure and content of the almanacs and ephemeris information relating to satellite orbit parameters between the two systems. Therefore a GPS navigation receiver is totally incompatible with GLONASS operation and modifications of major fundamental elements of a GPS receiver would be required to adapt it to GLONASS use.

Unfortunately, the frequency division scheme used by GLONASS required a very broad part of the radio spectrum, and certain in-band frequencies coincide with natural radio emissions from celestial objects in the universe. Thus GLONASS satellite transmissions were disturbing radio astronomy efforts around the world. In response, the number of channels used by GLONASS were cut in half. The way that this was accomplished was to arrange for pairs of satellites orbiting on opposite sides of the earth to share the same frequency. No one earth-bound receiver could possibly receive both transmissions simultaneously. A challenge is thus presented in GLONASS navigation receiver design to identify particular satellites, especially those sharing the same frequency, since none send any unique identifying data in their transmissions.

Further compounding GLONASS navigation receiver design is the fact that the particulars concerning the P-code transmissions is largely undocumented publicly, such information is kept classified by the Russian government. The details of the GLONASS L1 C/A code are officially available and researchers in the West have managed to decrypt the GLONASS P-code. It remains to be seen whether the GLONASS P-code can be encrypted. Further information on this subject is included in, "Global Satellite Navigation System GLONASS Interface Control Document (Second Wording)", Russian Institute of Space Device Engineering/ Research and Production Association of Applied Mechanics, 1991. Also see, "The USSR's GLONASS P-Code-Determination and Initial Results", by Gary R. Lennen, Proceedings of ION GPS-89, The Second International Technical Meeting of the Satellite Division of the Institute of Navigation, Colorado Springs, Colo., Sep. 27–29, 1989.

The GLONASS is more appealing for systems requiring superior point positioning accuracy because there appears to be no deliberate dithering function similar to selective availability (SA) connected with the GPS. It can also provide integrity enhancements to GPS navigation systems with independent system measurements. Such independent corroboration of measurements can be very valuable in automatic aircraft landing and geodetic surveying applications.

SUMMARY OF THE INVENTION

It is therefore an object of the present invention to provide a navigation receiver for operation with the global orbiting navigation satellite system.

It is a further object of the present invention to provide a navigation receiver that is reliable and accurate.

It is another object of the present invention to provide navigation receiver that provides high quality measurements on signals from the global orbiting navigation satellite system.

Briefly, a navigation receiver embodiment of the present invention comprises a radio frequency section that downconverts frequency division signals received from the several orbiting GLONASS satellites into a composite pseudo-baseband with spectral fold-over, a Nyquist sampling unit for sampling the composite signal at twenty-five MHz, and a programmable carrier frequency in-phase (I) and quadrature-phase (Q) digital multiplier for sorting through the composite signal to find a particular GLONASS satellite's signal. Once locked, the particular satellite is identified by comparing almanac and ephemeris information. In the event of P-code encryption, cross-correlations between L1 and L2 are performed by a correlation that is integrated over a whole data bit length and a proposed insertion bit is inverted or not inverted according to its sign before further summing.

An advantage of the present invention is that a global orbiting navigation satellite system navigation receiver is provided that exhibits superior point positioning accuracy over GPS receivers.

Another advantage of the present invention is that a global orbiting navigation satellite system navigation receiver is provided that can switch to cross-correlation to continue to have access to the high-quality L2 measurements for periods of encrypted P-code.

A further advantage of the present invention is that a global orbiting navigation satellite system navigation receiver is provided that performs reliable and accurate pseudo-range and carrier phase measurements.

Another advantage of the present invention is that a method is provided for a global orbiting navigation satellite system receiver to identify particular GLONASS satellites.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
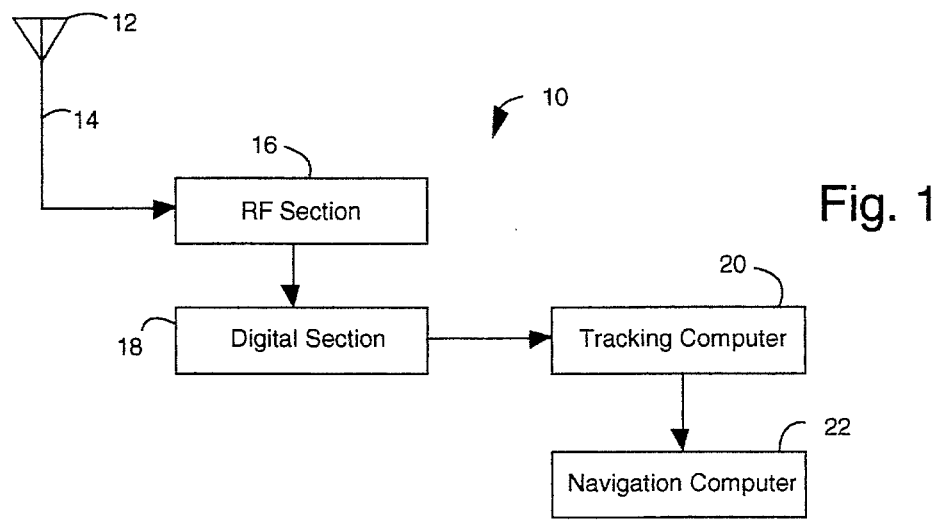
FIG. 1 is a block diagram of a navigation satellite system (GLONASS) navigation receiver embodiment of the present invention.

FIG. 1 illustrates a global orbiting navigation satellite system (GLONASS) navigation receiver embodiment of the present invention, referred to by the general reference numeral 10. Receiver 10 comprises an L1/L2 microstrip patch antenna and preamplifier combination 12 connected by a cable 14 to a radio frequency (RF) section 16, a digital processing section 18, a GLONASS satellite tracking computer 20 and a navigation computer 22. The computers 20 and 22 are implemented using software coded for their respective purposes. Such program software is preferably permanently loaded on a shared microprocessor system. The navigation computer 22 does pseudo-range measurements for estimating the distance between the receiver and any one of the orbiting GLONASS satellites. Carrier phase measurements are used for determining a carrier phase position of the receiver relative to the orbiting GLONASS satellites. Such measurements allow real-time kinematic (RTK) and surveying applications.

The RF section 16 mixes the L1 and L2 GLONASS carrier frequencies down to a pre-sampling frequency. The FDMA satellite vehicle (SV) signals are frequency tuned and mixed down to a pseudo-baseband frequency that is a composite of all the GLONASS satellites' signals present. Since the frequencies are not mixed all the way down to baseband, a spectrum fold-over occurs. This fold-over is "unraveled" in the digital section 18 by doing the final, third mix with in-phase (I) and quadrature (Q) phase signals to arrive at pseudo-baseband versions of I and Q. This technique allows the sampling rate to be reduced by 50%. Otherwise, the minimum sampling rate required would be twice the signal bandwidth. Therefore a convenient sampling rate of twenty-five MHz has given good results and does not overtax the abilities of the digital section 18 and the computers 20 and 22 to keep up with the incoming data. A sampling rate of 16.4075 MHz is the minimum Nyquist rate for L1, and 15.0325 MHz for L2. The GLONASS system is currently in a period of transitioning from twenty-four to twelve frequency slots, so it is preferable to have receivers that will tune in both sets, as the ultimate GLONASS configuration that will be settled upon is unclear.

Each L1 and L2 frequency has a bandwidth of ±12.5 MHz. The digital section 18 quadrature samples the mixed-down frequencies at a twenty-five MHz Nyquist rate. Such samples contain all the SV's L1 and L2 information. The spread spectrum code and radio carrier are stripped-off by the digital section 18 and sends corrections to the tracking computer 20 to complete control loops and to enable measurements.

Figure 2:
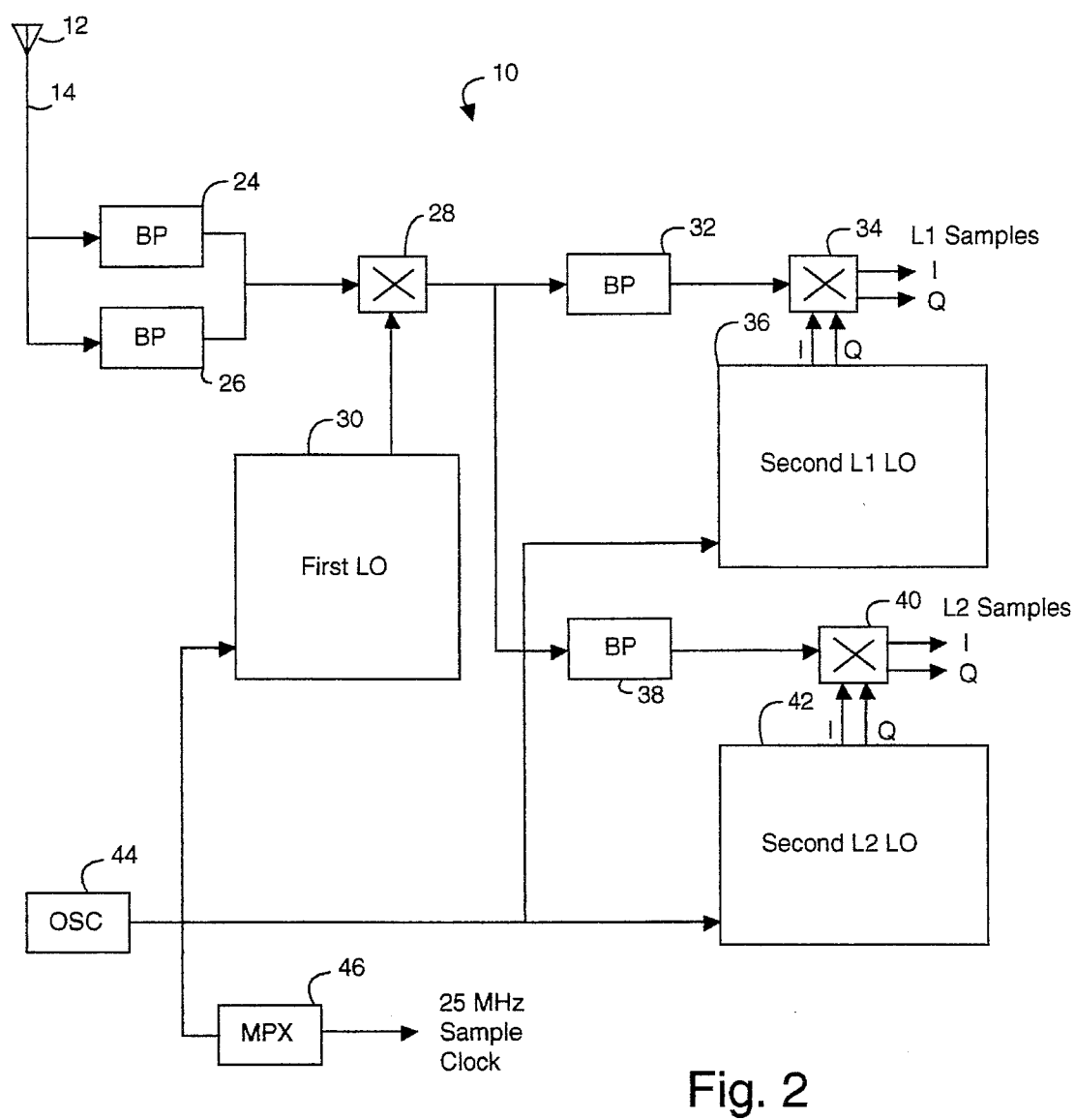
FIG. 2 is a block diagram of the radio frequency section of the receiver of FIG. 1.

In FIG. 2, the RF section 16 is shown to comprise an L1 bandpass (BP) filter 24, an L2 bandpass (BP) filter 26, a first mixer 28, a first local oscillator (LO) 30, an L1 intermediate frequency (IF) bandpass (BP) filter 32, an L1 mixer 34, a second L1 local oscillator (LO) 36, an L2 intermediate frequency (IF) bandpass (BP) filter 38, an L2 mixer 40, a second L2 local oscillator (LO) 42, a master oscillator 44 and a sample clock frequency multiplier 46. The L1 BP filter 24 is tuned to 1608.75 MHz, one dB down at twenty MHz. The L2 BP filter 26 is tuned to 1251.25 MHz, one dB down at twenty MHz. The first LO 30 provides a 1130.6666 MHz signal to the first mixer 28. The L1 IF-BP filter 32 is tuned to 478.08 MHz, three dB down at thirty MHz. The L2 IF-BP filter 38 is tuned to 120.58 MHz, three dB down at thirty MHz. The second L1 LO 36 provides a 477.941 MHz signal to the L1 mixer 34. An L1 pseudo-baseband of 155 KHz is output by the L1 mixer 34. The second L2 LO 42 provides a 120.625 MHz signal to the L2 mixer 40. An L2 pseudo-baseband of forty-five KHz is output by the L2 mixer 40. The master oscillator 44 operates at five MHz and a Nyquist sample clock frequency of twenty-five MHz is output by the frequency multiplier 46.

Figure 3:
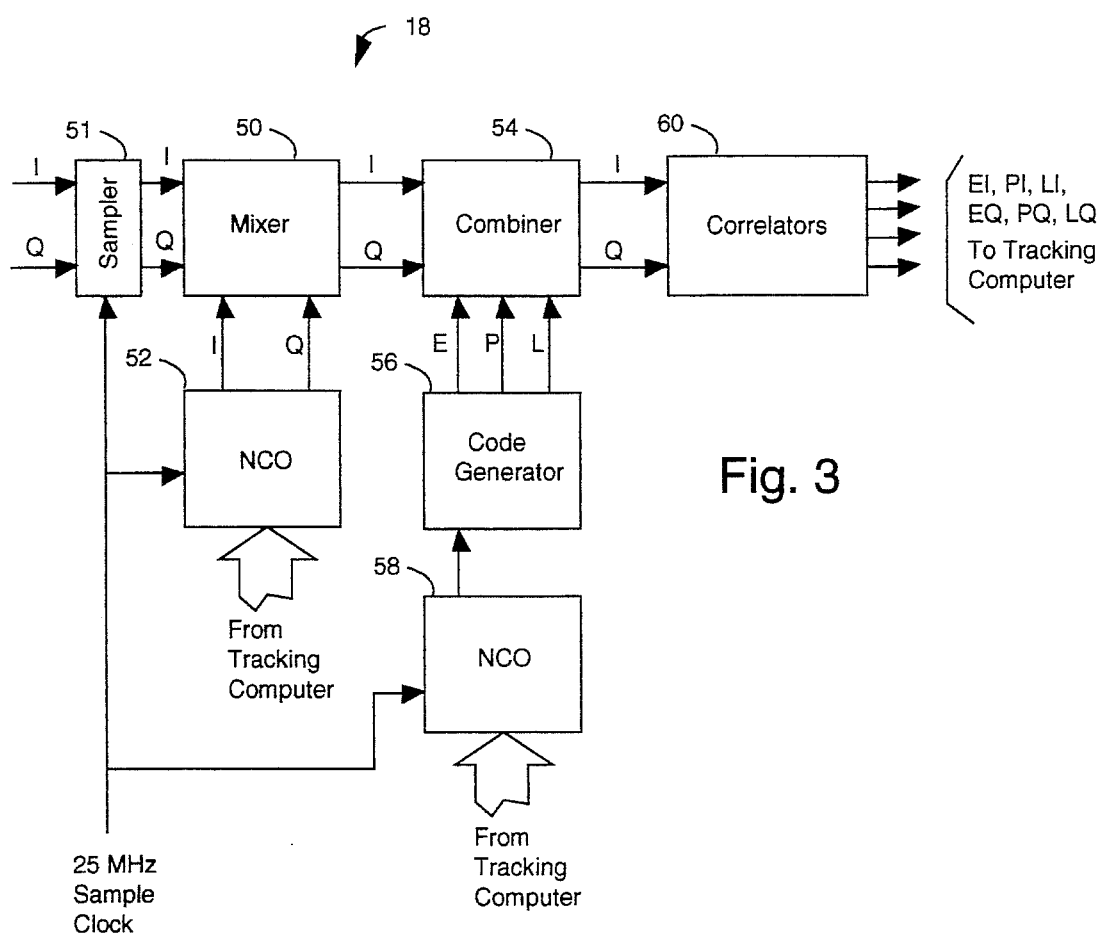
FIG. 3 is a block diagram of the digital section of the receiver of FIG. 1.

The digital section 18 is illustrated in FIG. 3 and is shown to comprise a carrier mixer 50, a sampler 51, a local carrier numerical controlled oscillator (NCO) 52, a code correlator combiner 54, a local code generator 56 for coarse acquisition (C/A) and precision (P) code, a code numerical controlled oscillator (NCO) 58 and a plurality of correlators 60. All are clocked by a twenty-five MHz sample clock from frequency multiplier 46. Both in-phase (I) and quadrature-phase (Q) signals are input and output by the carrier mixer 50. These signals contain all the GLONASS satellites' signals, differentiated only by the respective baseband offsets. The local carrier NCO 52 is controlled by the tracking computer 20 to adjust a particular GLONASS satellite's transmission to be mixed down to baseband. Early (E), punctual (P) and late (L) code signals are output by the generator 56 to the correlator combiner 54. The tracking computer 20 (FIG. 1) is bussed to both the local carrier NCO 52 and code NCO 58 to allow a lock-on of satellite tracking. The correlators 60 output their respective signals to the tracking computer 20. The further specifics of how SV's are tracked and correlated are unnecessary here because conventional techniques known to those skilled in the art of GPS navigation receiver design can be used.

Figure 4:
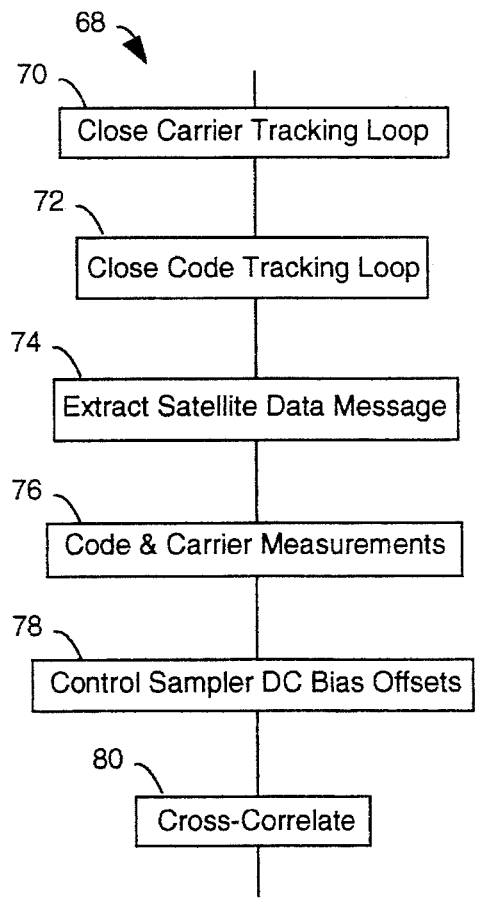
FIG. 4 is a flowchart of the computer-implemented tracking process in the tracking computer of the receiver of FIG. 1.

The tracking computer 20 comprises a computer-implemented process 68, illustrated in FIG. 4, that has a step 70 for closing the carrier tracking loop with NCO 52, a step 72 for closing the code tracking loop with NCO 58, a step 74 for extracting the satellite data message to be sent to the navigation computer 22, a step 76 for making code and carrier phase measurements to be sent to the navigation computer 22, a step 78 for controlling DC bias offsets in the Nyquist sampling, and a step 80 for cross-correlation operations between L1 and L2 when L2 has an encrypted P-code.

The L1 P-code has a data message and L2 P-code does not. With prior art simple cross-correlation, no signal will be observed. Therefore, the step 80 integrates the correlation over the P-code data bit length and inverts or not-inverts the proposed insertion bit according to its sign before further summing. For example see, U.S. Pat. No. 4,463,357, issued Jul. 31, 1984, to Peter F. MacDoran.

Ideally, there would be six correlators in the plurality of correlators 60, in order to produce early, punctual and late signals for each of I and Q. However, in order to conserve the hardware required, the number of correlators 60 can be reduced to four, e.g., early-I, early-Q, late-I, and late-Q correlators, for search mode. The objective is to have at least two correlators that are far apart in order to simultaneously search for signal power during initialization. In tracking mode, the correlators 60 are assigned to early-I, late-I, punctual-I and punctual-Q. The difference between early-I and late-I is used by the tracking computer 20 to close the code tracking loop, and punctual-I and punctual-Q (PI and PQ) are used to close the carrier tracking loop, e.g., by minimizing PQ/PI. Carrier phase measurements are obtained directly by reading the local carrier NCO 52. The code phase is measured by moving the values supplied to the code NCO 58. Carrier phase measurements are useful in precision applications, e.g., surveying.

Figure 5:
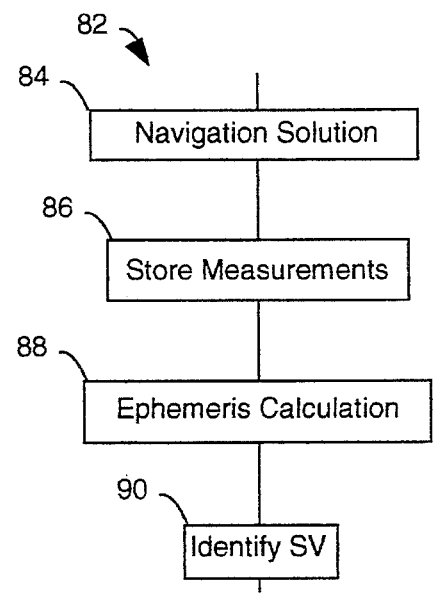
FIG. 5 is a flowchart of the computer-implemented navigation process in the navigation computer of the receiver of FIG. 1.

The navigation computer 22 comprises a computer-implemented process 82, illustrated in FIG. 5, that has a step 84 for computing a navigation solution, a step 86 for storing measurements for post-processing, a step 88 for ephemeris calculation using a fast method, and a step 90 for determining which of the several GLONASS satellites in particular is locked-on by the receiver 10 at first lock-on.

The almanac provides a satellite vehicle (SV) designation number for all the GLONASS satellites which identifies each particular satellite's position in its orbit (1 . . . 24). There are intended to be eight satellites in each orbit 45° apart in three orbit planes. Each satellite typically receives the same almanac, e.g., the almanac for all the satellites currently in the system. Therefore, this data provides no unique identifying information about a currently locked-to satellite. Each satellite does however transmit its own unique ephemeris data, which is the precise information about the satellite location needed for navigation, and this information contains the carrier frequency of the received satellite signal. As two satellites can potentially be transmitting on the same carrier frequency, there exists an uncertainty about which one of the two possible is currently locked-to.

Almanac calculations are done for all the GLONASS satellites and the ephemeris calculation for the one the receiver 10 is locked to, a match of any of the available SV's to the ephemeris calculation within ten kilometers is assumed to be a match and is therefore identified by its SV designation number from the almanac.

With regard to the step 88, the ephemeris calculation is an interpreted solution to a set of second-order differential equations. Ordinarily, this requires excessive computational time. The present invention transfers the coordinate system to a different reference frame, and thus is able to speed-up the output of a solution.

GLONASS orbit calculations are derived from three dimensional X, Y, and Z position, velocity and acceleration figures that are updated periodically. If the time from the last update is relatively large, e.g., fifteen minutes, the calculation of the orbit can take large amounts of processing time, especially if the step size for each integration is small, e.g., 0.10 second steps. Therefore, larger step sizes, e.g., one minute, can be used to speed orbit calculations, with a concomitant loss of accuracy. To cope with this situation, a high-order term for earth-rotation acceleration in the differential equations has its reference frame changed. This eliminates the acceleration terms, and a larger step size can be used because the acceleration terms can no longer perturb the solution. The reference frame is changed from earth-fixed coordinates to star-fixed, so any earth rotation terms drop out of the calculations. Therefore a step size of ten seconds can produce acceptable results.

For example, the GLONASS ephemeris calculation can be done as follows:

$$\frac{dV_x}{dt} = -\frac{\mu}{r^3} x + \frac{3}{2} c_{20} \frac{\mu a_e^2}{r^5} \times \left[ 1 - \frac{5z^2}{r^2} \right] + \quad (1)$$

$$\omega_3^2 x + 2\omega_3 v_y + \ddot{x};$$

-continued $$\frac{dv_y}{dt} = -\frac{\mu}{r^3} y + \frac{3}{2} c_{20} \frac{\mu a_e^2}{r^5} y \left[ 1 - \frac{5z^2}{r^2} \right] + \quad (2)$$

$$\omega_3^2 y - 2\omega_3 v_x + \ddot{y}; \text{ and}$$

$$\frac{dv_z}{dt} = -\frac{\mu}{r^3} z + \frac{3}{2} c_{20} \frac{\mu a_e^2}{r^5} z \left[ 3 - \frac{5z^2}{r^2} \right] + \ddot{z} \quad (3)$$

where $r = \sqrt{x^2 + y^2 + z^2}$ , where
$r = \sqrt{x^2 + y^2 + z^2}$,
$\mu = 398600.44$ km$^3$/c$^2$ (gravitational constant),
$a_e = 6378.136$ km (radius of equator),
$c_{20} = -1082.63 \times 10^{-6}$, and
$w_3 = 0.7292115 \times 10^{-4}$ radians/second (earth's angular rotation velocity).

The satellite ephemeris yields (x, y, z), ($v_x$, $v_y$, $v_z$) and ($\ddot{x}$, $\ddot{y}$, $\ddot{z}$), at reference time with reference to earth-centered, earth-fixed (ECEF).

Simplifying, $$\frac{dv_x}{dt} = k_1 x + k_2 x [1 - k_3 z^2] + \ddot{x} + \quad (4)$$

$$\left[ \begin{array}{c} A \\ \omega_3^2 x + 2\omega_3 v_y \end{array} \right];$$

$$\frac{dv_y}{dt} = k_1 y + k_2 y [1 - k_3 z^2] + \ddot{y} + \quad (5)$$

$$\left[ \begin{array}{c} B \\ \omega_3^2 y + 2\omega_3 v_x \end{array} \right]; \text{ and}$$

$$\frac{dv_z}{dt} = k_1 z + k_2 z [3 - k_3 z^2] + \ddot{z}. \quad (6)$$

The reference frame is then translated from ECEF to star-fixed which makes the term $w_3=0$, eliminating "A" and "B". Therefore, equations (4)–(6) become, $$\frac{dv_x}{dt} = k_1 x + k_2 x [1 - k_3 z^2] + \ddot{x}; \quad (7)$$

$$\frac{dv_y}{dt} = k_1 y + k_2 y [1 - k_3 z^2] + \ddot{y}; \text{ and} \quad (8)$$

$$\frac{dy_z}{dt} = k_1 z + k_2 z [3 - k_3 z^2] + \ddot{z}. \quad (9)$$

The numerical integration solution to equations (7)–(9) is less sensitive to error growth with selection of the time interval than the standard equations (4)–(6). This produces a significant savings in the computational time required by a GLONASS receiver to obtain adequate ephemeris solutions. Therefore, a time interval selection of ten seconds for projecting the orbit position from reference time to current time in equations (7)–(9) more or less duplicates the performance of equations (4)–(6) using a 0.1 second interval time selection.

In the step 90, satellite data from the step 74 does not identify the particular GLONASS satellite. Therefore, the step 90 compares almanac and ephemeris calculations, and if they agree, the correct satellite has been assumed.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global orbiting navigation satellite system (GLONASS) navigation receiver, comprising:

a radio frequency (RF) down-conversion section having a RF input to receive microwave radio transmissions from orbiting GLONASS satellites and a pseudo-baseband output in which a plurality of GLONASS satellite carriers separated in frequency are mixed-down to a near baseband composite signal that exhibits a spectral fold-over;

a Nyquist sampling unit included in a final stage of the RF down-conversion section and operating in the range of twenty to twenty-five MHz for generating in-phase (I) and quadrature-phase (Q) signals from said composite signal; and a digital carrier mixer connected to receive said I and Q signals and having a programmable frequency that provides for a digital baseband selection among particular GLONASS satellites.

2. The receiver of claim 1, further comprising:

a correlator combiner connected to the digital carrier mixer with I and Q signals and having a local code generator with early, punctual and late signals for coarse acquisition and precision codes; and a numerically controlled oscillator (NCO) connected to said generator for controlling the correlator combiner.

3. The receiver of claim 2, further comprising:

a plurality of correlators connected to the correlator combiner; and a tracking computer connected to receive signals from the plurality of correlators and connected to control the NCO and said programmable frequency in the digital carrier mixer.

4. The receiver of claim 3, wherein:

the tracking computer has a computer-implemented process including a step for closing a carrier tracking loop with said programmable frequency in the digital carrier mixer, a step for closing a code tracking loop with the NCO, a step for extracting a GLONASS satellite data message, a step for making code and carrier phase measurements, a step for controlling any DC bias offsets in the Nyquist sampling unit, and a step for cross-correlation operations between an L1 and an L2 carrier frequency when L2 has an encrypted P-code, wherein said correlation is integrated over a whole data bit length and a proposed insertion bit is inverted or not inverted according to its sign before further summing.

5. The receiver of claim 4, further comprising:

a navigation computer connected to the tracking computer and having a computer-implemented process with a step for computing a navigation solution, a step for storing measurements for post-processing, a step for ephemeris calculation, and a step for determining which of the several GLONASS satellites in particular is in lock by the receiver by comparing an almanac calculation and an ephemeris calculation derived from said GLONASS satellite data message.

6. The receiver of claim 5, further comprising:

said step for ephemeris calculation uses an earth-fixed coordinate reference frame, wherein a high-order differential equation term for earth-rotation acceleration is eliminated and a larger step size of integration can be used for orbit parameter calculation from an X, Y, Z position, velocity and acceleration information in said GLONASS satellite data message because the earth rotation acceleration terms can no longer perturb the solution.

7. The receiver of claim 5, wherein:

the navigation computer further comprises pseudo-range measurement means for determining an estimate of the distance between the receiver and said orbiting GLONASS satellites.

8. The receiver of claim 2, further comprising:

carrier phase measurement means connected to the NCO for determining a carrier phase position of the receiver relative to said orbiting GLONASS satellites.

* * * * *